(No Model.) 2 Sheets—Sheet 1.

H. S. MINOT.
PLUMB LEVEL.

No. 597,886. Patented Jan. 25, 1898.

Witnesses.
C. F. Kilgore
P. D. Merchant.

Inventor:
Homer S. Minot
By his Attorney
Jas. F. Williamson

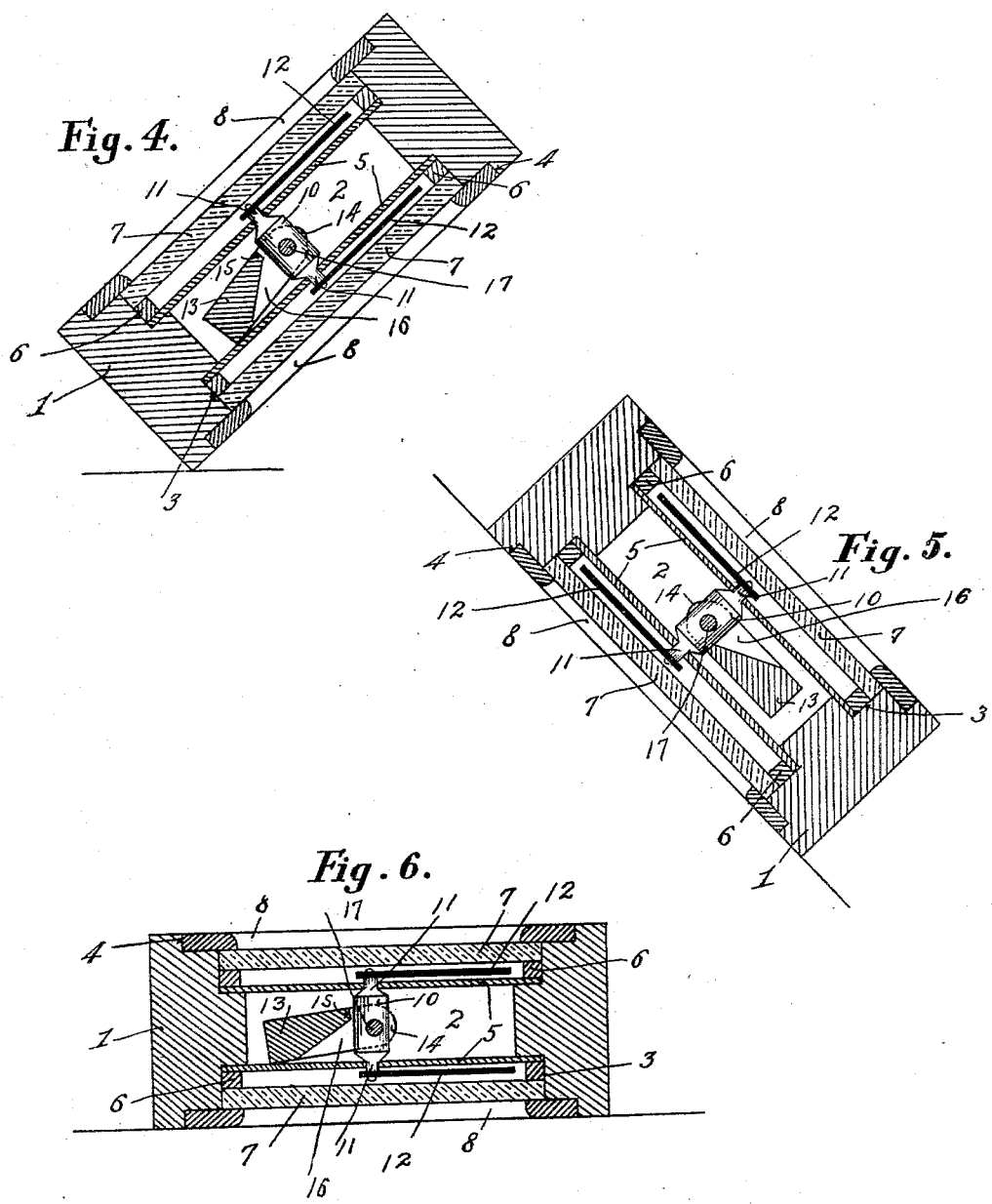

UNITED STATES PATENT OFFICE.

HOMER S. MINOT, OF MINNEAPOLIS, MINNESOTA.

PLUMB-LEVEL.

SPECIFICATION forming part of Letters Patent No. 597,886, dated January 25, 1898.

Application filed November 7, 1896. Serial No. 611,433. (No model.)

*To all whom it may concern:*

Be it known that I, HOMER S. MINOT, a citizen of the United States, residing at Minneapolis, in the county of Hennepin and State of Minnesota, have invented a new and useful Improvement in Levels, Plumbs, and Inclinometers, of which the following is a specification.

My invention relates in general to instruments of the level, plumb, and inclinometer type, such as are used by machinists, carpenters, masons, and other mechanics, but is particularly directed to that class of these instruments which embody the principle of pendulum gravitation; and it has for its principal object to provide a simple and efficient device for stopping the vibration of the pendulum or vibrating part of the indicator when the instrument is turned or inclined on a predetermined side, while permitting the unobstructed gravity action of said pendulum when the instrument is turned or inclined on its other side or is set edgewise in a vertical plane.

To this end my invention consists of the novel devices and combinations of devices hereinafter described, and defined in the claims.

The preferred form of my invention is illustrated in the accompanying drawings, wherein like characters indicate like parts throughout the several views.

Figure 1:
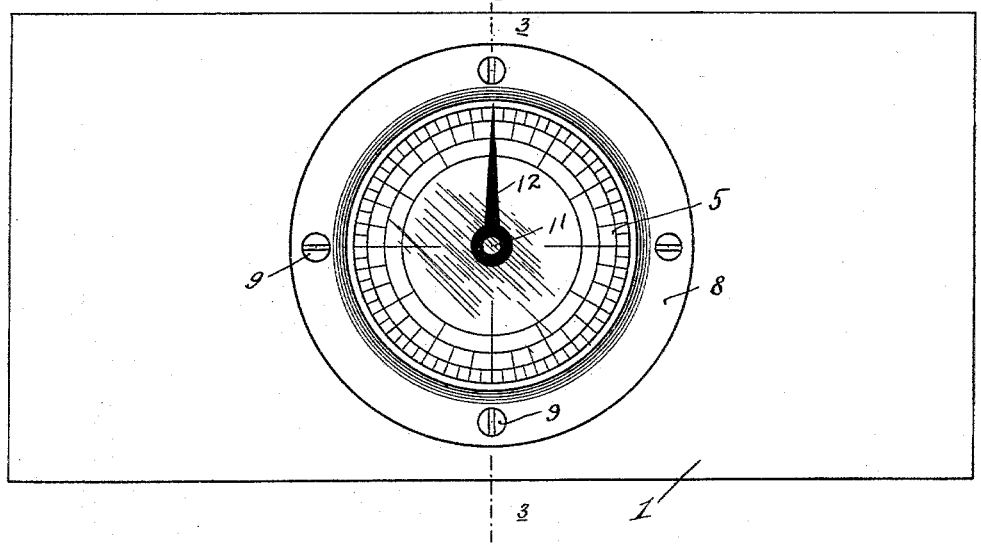
Figure 2:
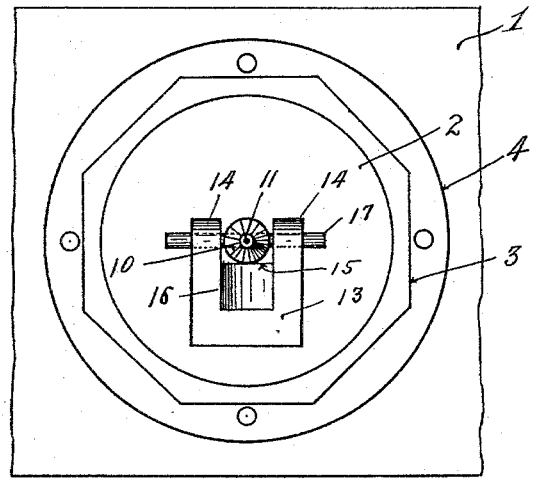
Figure 3:
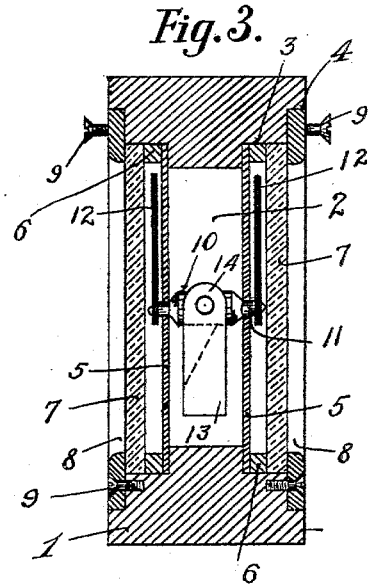

Figure 1 is a side elevation of an instrument constructed in accordance with my invention, which instrument is adapted to be used either as a level, plumb, or inclinometer. Fig. 2 is a view in side elevation, but with some parts broken away and others removed, so as to show the interior mechanism of the instrument illustrated in Fig. 1. Fig. 3 is a transverse vertical section taken on the line 3 3 of Fig. 1, some parts being shown in full; and Figs. 4, 5, and 6 are also transverse vertical sections taken on the line $X^3$ $X^3$ of Fig. 1, but illustrating different positions into which the instrument may be placed, and also the different actions of my improved pendulum in the said different positions of the instrument.

1 indicates the body of the instrument above briefly referred to and which, for the sake of brevity, I may term the "level" or "level-body." At approximately its central portion the level-body 1 is provided with a large perforation or cylindrical seat 2, which is abruptly expanded or enlarged at its ends to form two pair of shouldered seats 3 and 4. The shouldered seat 4 may be circular, but the shouldered seat 3 should be polygonal in form, for a purpose which will hereinafter appear.

5 indicates the dials or indicator-disks, which are mounted in and pressed against the shouldered seats 3. These dials 5 are graduated or marked in degrees of a circle.

6 indicates spacing-rings which are pressed against the outer edges or perimeters of the dials 3 and are in turn pressed by crystals or glass faces 7, which also fit in the polygonal seats 3. In the particular construction shown the shouldered seats 3 are octagonal and both the dials 5 and crystals 7 are of corresponding size and form, so that when they are properly set in working positions they cannot possibly turn or rotate so as throw the instrument out of adjustment. The crystals or glass faces 7 are directly clamped and held in working positions by means of clamping-rings 8, which fit in the shouldered seats 4, with their outer faces flush with the sides of the level-body 1 and with their inner edges overlapping the outer edges of the crystals 7. The clamping-rings 8 are, as shown, removably secured in working positions by means of screws 9, passed through suitable seats in the same and screwed into the body 1.

A stub-shaft or oscillating pivot-block 10 is mounted at the axis of the seat or perforation 2. with its reduced ends 11 working through the central portions of the dials 5 and terminating within the chambers formed between said dials and the adjacent crystals 7. Each end 11 of the shaft 10 is provided with an indicator-finger or pointer 12. These indicator-fingers 12 work over the faces of the dials 5 and normally stand in vertical positions under the action of a pendulum of novel construction, which will be described. In its preferred form this pendulum 13 is bifurcated to form prongs 14, a stop-shoulder 15, and a beveled or cut-away portion 16. The prongs 14 of this pendulum 13 are pivoted to the central portion of the shaft 10 by means of a pivot-pin 17, which is passed transversely and horizontally through the said shaft 10 and lugs 14. By this means the pendulum 13 is so connected to the shaft 10 that it must move with said shaft and indicator-fingers 12 when any of said parts are given pivotal movement around the axial center of the said shaft. Normally the shoulder 15 engages the shaft 10 and prevents the pendulum 13 from cross-swinging or swinging sidewise into engagement with the dial 5, which stands on the same side of the level as said shoulder 15. However, the incline or bevel portion 16 will permit the free end of the pendulum 13 to cross-swing or vibrate laterally, so that it will frictionally engage and press against the inner face of the dial 5, which stands adjacent to said incline 16, whenever the level is tilted laterally, as shown in Fig. 4, or is turned down flat, as shown in Fig. 6. As is obvious, this frictional engagement between the pendulum and the dial will stop all vibrations or oscillatory movements of the pendulum-shaft 10 and indicator-fingers 12.

The purposes and uses of the construction above described will now be illustrated by example. When the instrument is to be used to determine the level or incline of a body or structure which has a surface that is horizontal transversely of the direction in which the level is applied, the instrument will, as is ordinary, be set edgewise in a vertical plane, as illustrated in Fig. 3, in which position the automatic gravity action of the indicator will be substantially as in ordinary constructions.

When it is desired to determine the level of a body—such, for example, as a transverse shelf or ledge on an inclined plane or roof—the instrument may be tilted or inclined toward one side, as illustrated in Fig. 5, so as to throw one face of the instrument against the roof or inclined plane. In this position the pendulum 13 will act the same as if it was rigidly secured to the shaft 10, and will freely vibrate, so as to bring the pointers 12 to the highest points on the dials. If, however, for the sake of saving time it is desired to quickly stop the movement of the pendulum, which under the action of handling has been given a violent motion, this may be readily and instantly accomplished simply by tilting the instrument onto its opposite side, as illustrated in Fig. 4 and already commented upon. Again, if after having taken the incline or the level of a body it is desired to stop the indicator-fingers in positions to retain the indication for some little time the instrument may be carefully turned either from the position indicated in Fig. 3 or in Fig. 5 into the position indicated in Fig. 4. The instrument may then be laid down on one side, as illustrated in Fig. 6, and the indicator-fingers will be frictionally held in their set positions.

In shipping the instrument or in carrying the same from one place to another the instrument should always be turned on the side illustrated in Fig. 6, as by so doing all vibratory movements of the pendulum or movable parts of the indicator are stopped and a great saving of wear on the journals of the same is prevented.

The device above specifically described I consider one of the best and simplest forms which my invention may take; but I do not, however, limit myself to these specific details. On the contrary I desire to claim the same in the broadest possible manner.

I consider myself the first to provide an instrument of the above character wherein the pendulum or gravity-moved member of the indicator will operate when the instrument is tilted on one side, but will be stopped or held from vibratory movements when the said instrument is tilted or turned on its other side. Therefore any form of device or combination of devices which will accomplish this result I consider within the scope of my invention.

In the construction shown the pendulum itself being mounted for transverse or crosswise movement is caused to perform the double function both of a pendulum (its ordinary action) and of a brake or stop for stopping the vibratory movements of the indicator-finger or pointer. However, it would be within the scope of my invention to provide an independent transversely-movable part to serve the purpose of a brake. It will also be understood that the principles of construction above set forth might be applied to an indicator regardless of which member of the same is movable and which is fixed.

The word "pointer," as herein used, is intended to indicate the movable member of the indicator.

What I claim, and desire to secure by Letters Patent of the United States, is as follows:

1. In an instrument of the class described, an indicator involving a pendulum-actuated finger or pointer, and a gravity-operated brake or stop, mounted for movement crosswise and to one side only of the body of the instrument, to stop the vibrations of the pendulum or movable part of the indicator, when the instrument is turned or inclined on a predetermined side.

2. In an instrument of the class described, an indicator involving a pendulum-actuated finger or pointer, and a pendulum movable with said finger or pointer, but free for crosswise movement, to one side only of the instrument, for engagement with a fixed part thereof, to stop the vibrations of said finger or pointer.

3. In an instrument of the class described, the combination with a dial, fixed on the body of the instrument, of a pivoted index-finger coöperating therewith, and a gravity-pendulum controlling the movement of said index-finger and having a crosswise or transverse movement to one side only, for engagement with a relatively-fixed part, to stop the vibrations of said index-finger, substantially as described.

4. In an instrument of the class described, the combination with the pair of dials secured to the opposite sides of the body of the instrument, of the shaft or pivot-block journaled in said dials and provided at its outer ends with indicator-fingers, and the pendulum pivoted on said shaft or pivot-block, with freedom for movement to one side of the instrument only, substantially as and for the purpose set forth.

5. The combination with the body 1, provided with the seat 2 and shouldered seats 3, 4, of the pair of dials 5 and crystals 7 fitting said seat 3, the clamping-ring 8 fitting the seat 4 and holding the crystals in position, the shaft 10 with reduced ends 11 journaled in said dials 5, the indicator-fingers 12 on said reduced ends 11, and the pendulum 13 secured to said shaft 10 by the pin 17 and provided with the stop-shoulder 15 and beveled portion 16, substantially as described.

HOMER S. MINOT.

Witnesses:
THOS. R. MARSTON,
CHAS. A. ERDMANN.